United States Patent [19]

Castonguay et al.

[11] Patent Number: 5,534,833
[45] Date of Patent: Jul. 9, 1996

[54] CIRCUIT BREAKER REMOTE CLOSING OPERATOR

[75] Inventors: Roger N. Castonguay, Terryville; James J. Smith, Avon; Thomas A. Murphy, Southington, all of Conn.

[73] Assignee: General Electric Company, New York, N.Y.

[21] Appl. No.: 323,305

[22] Filed: Oct. 11, 1994

[51] Int. Cl.$^6$ ........................................ H01H 3/00
[52] U.S. Cl. .......................... 335/68; 200/400; 335/14
[58] Field of Search ........................ 335/14, 20, 76, 335/68, 71, 72, 75, 77; 200/400, 401

[56] References Cited

U.S. PATENT DOCUMENTS

| | | | |
|---|---|---|---|
| 2,264,982 | 12/1941 | Johnson | 335/68 |
| 3,600,538 | 8/1971 | Pazas | 200/153.2 |
| 3,767,874 | 10/1973 | Wilson | 200/50 AA |
| 3,789,172 | 1/1974 | Cole et al. | 200/153 SC |
| 4,001,742 | 1/1977 | Jencks et al. | |
| 4,301,433 | 11/1981 | Castonguay et al. | |
| 4,301,434 | 11/1981 | Castonguay et al. | |
| 4,409,449 | 10/1983 | Takano et al. | 335/76 |
| 4,658,322 | 4/1987 | Doughtery et al. | |
| 4,713,505 | 12/1987 | Date et al. | 200/153 SC |
| 4,801,907 | 1/1989 | Kelaita et al. | |

*Primary Examiner*—Lincoln Donovan
*Attorney, Agent, or Firm*—Carl B. Horton; Richard A. Menelly

[57] ABSTRACT

A remote closing operator is positioned within a circuit breaker enclosure to allow remote operation of the circuit breaker operating mechanism to open and close the circuit breaker contacts. A pair of solenoids are employed to control the state of the contact closing springs. The first solenoid is energized to initially release the contact closing springs and the second solenoid is energized to interrupt the flow of current to the first solenoid.

14 Claims, 5 Drawing Sheets

CIRCUIT BREAKER REMOTE CLOSING OPERATOR

BACKGROUND OF THE INVENTION

U.S. Pat. No. 4,001,742 entitled "Circuit Breaker Having Improved Operating Mechanism" describes a circuit breaker capable of interrupting several thousand amperes of circuit current at several hundred volts potential. As described therein, the operating mechanism controls the powerful operating springs that open and close the circuit breaker contacts. Once the operating mechanism has responded to separate the contacts, the operating springs must be recharged to supply sufficient motive force to the movable contact arms that carry the contacts.

U.S. patent application Ser. No. 08/214,522 filed 18 Mar. 1994 entitled "Handle Operator Assembly for High Ampere-rated Circuit Breaker" describes an assembly for manually charging the circuit breaker contact closing springs.

U.S. patent application Ser. No. 08/218,287 filed 28 Mar. 1994 entitled "Latching Arrangement for High Ampere-rated Circuit Breaker" describes the latching arrangement used to retain the powerful operating mechanism springs from driving the circuit breaker contacts to the closed position.

U.S. patent application Ser. No. 08/265,877 filed 27 Jun. 1994 entitled "Handle Interlock Arrangement for High Ampere-Rated Circuit Breakers" describes restraining the circuit breaker contact closing springs until the circuit breaker operating handle is in a fully retracted position.

U.S. patent application Ser. No. 08/304,331 filed 9 Sep. 1994 entitled "Positive Charge Indicator Arrangement for High Ampere-Rated Circuit Breaker" describes interlocking the circuit breaker charging springs indicator flag by means of a logic plate and logic lever to prevent the charge indicating flag from signaling until and unless the closing springs are fully charged.

U.S. patent application Ser. No. 08/266,409 filed Jun. 27, 1994 entitled "Sequential Close Interlock Arrangement for a High-Rated Circuit Breaker" describes the interaction between a closing link and the circuit breaker contact closing springs to prevent operation of the circuit breaker closing button.

When operating circuit breakers remote from the circuit breaker enclosure, devices such as holding solenoids, closing solenoids, and the like are used to release the circuit breaker contact closing springs. Such devices are described within U.S. Pat. Nos. 4,301,433 and 4,301,434. However, with the powerful contact closing springs used within such high-ampere rated circuit breakers, remote closing devices, per se, are not capable of protecting the remote closing solenoid from damage when the closing solenoid is continuously energized.

One purpose of the invention is to provide a field installed remote circuit breaker contact closing operator that is able to withstand repeated closing attempts without damaging the closing solenoid.

SUMMARY OF THE INVENTION

A remote closing operator is positioned within a circuit breaker enclosure to allow remote operation of the circuit breaker operating mechanism to close the circuit breaker contacts. A pair of first and second solenoids are employed to control the state of the contact closing springs. The first solenoid is energized to initially release the contact closing springs and the second solenoid is energized to prevent any further attempt to continuously energize the first solenoid. A pair of opposedly arranged torsion springs interact with a pair of microswitches to insure that the first solenoid is turned off and the second solenoid is turned on immediately after the contact closing springs have become released.

DESCRIPTION OF THE PREFERRED EMBODIMENT

Figure 1:
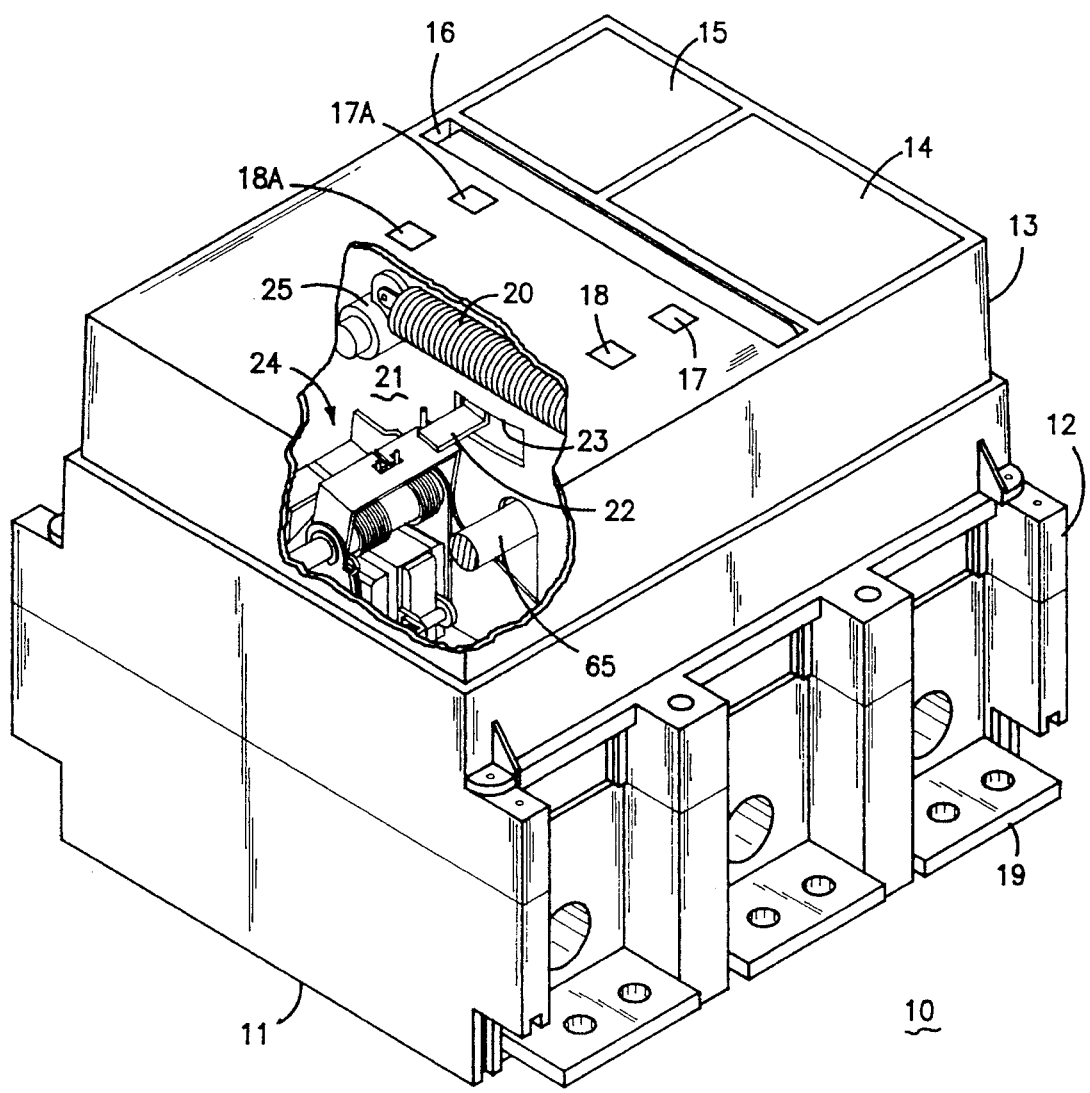
FIG. 1 is a top perspective view of a high ampere-rated circuit breaker with a portion of the circuit breaker cover removed to depict the remote contact closing assembly according to the invention.
Figure 2:
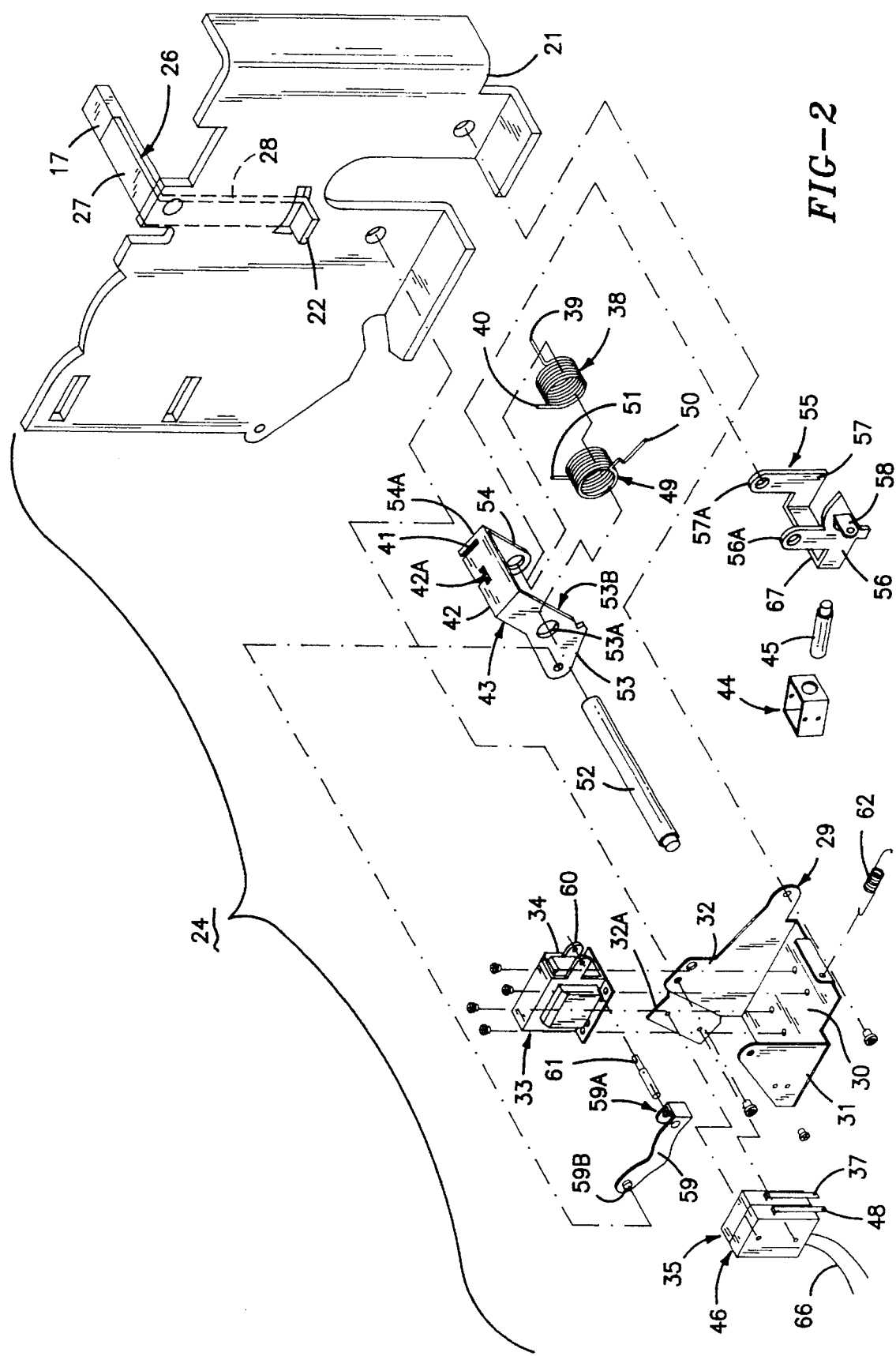
FIG. 2 is a top perspective view of the remote closing assembly of FIG. 1 with the components in isometric projection.
Figure 3:
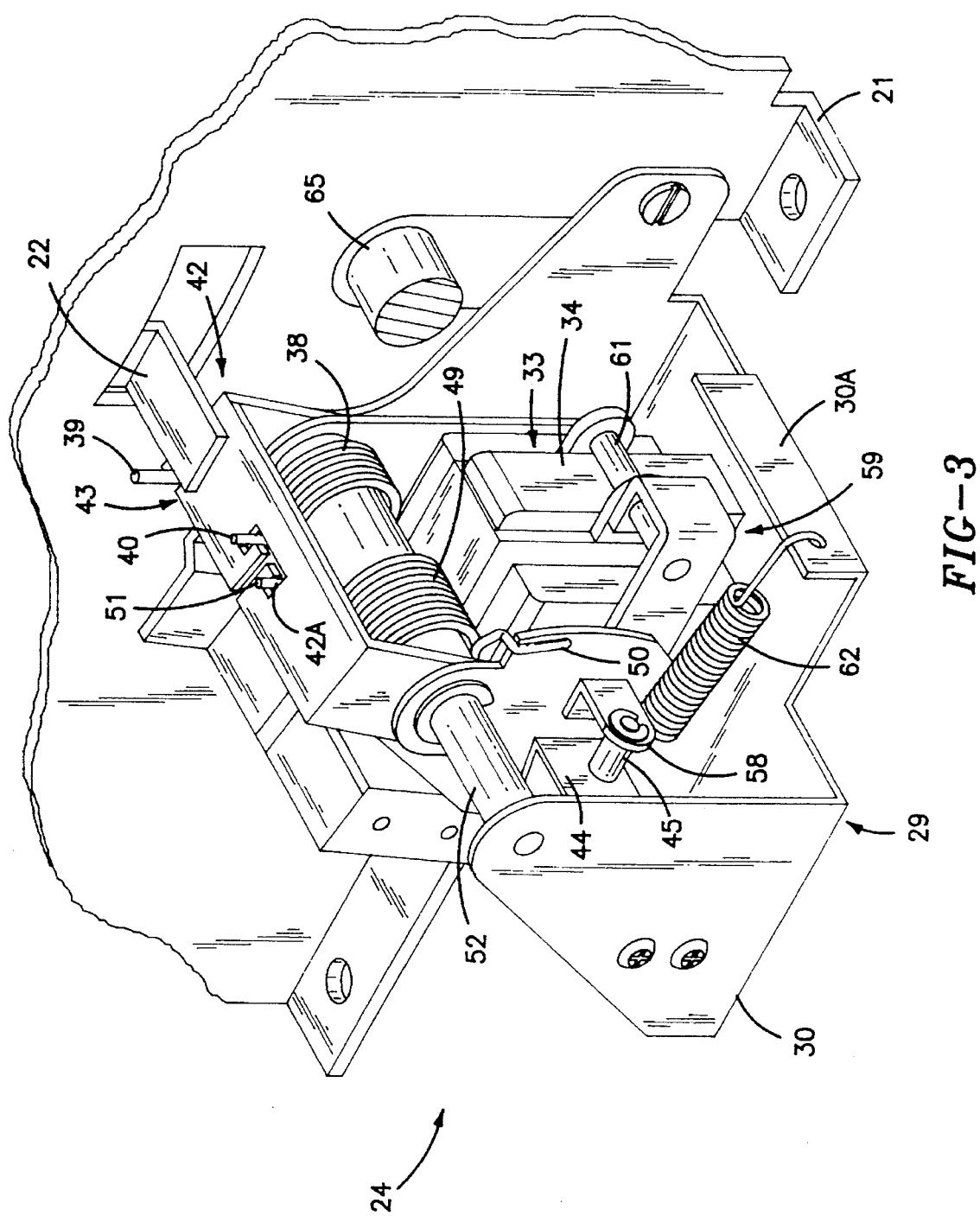
FIG. 3 is an enlarged top perspective view of the remote contact closing assembly of FIG. 1.

The high ampere-rated circuit breaker 10 shown in FIG. 1 is capable of transferring several thousand amperes quiescent circuit current at several hundred volts potential. The circuit breaker consists of an electrically insulated base 11 to which an intermediate cover 12 of similar insulative material is attached prior to attaching the top cover 13 also consisting of an electrically-insulative material. Electrical connection with the interior current-carrying components is made by load terminal straps 19 extending from one side of the base and line terminal straps (not shown) extending from the opposite side thereof. The interior components are controlled by an electronic trip unit contained within a recess 14 on the top surface of the top cover 13 The trip unit is similar to that described within U.S. Pat. No. 4,658,323 and interacts further with an accessory within an accessory recess 15 to provide a range of protection and control functions such as described, for example within U.S. Pat. No. 4,801,907. The operating mechanism as described within the U.S. patent application Ser. No. 08/203,062 filed 28 Mar. 1994 entitled "Rating Module Unit for High Ampere Rated Circuit Breakers" includes a closing shaft 25 which provides the forces required to charge the powerful operating mechanism contact closing springs 20. The operating handle 16 allows manual operation of the circuit breaker operating mechanism. The operating mechanism components are attached to the operating mechanism sideframe 21 through which the closing shaft 25 and drive shaft 65 extend in the manner described within several of the aforementioned U.S. Patent Applications. The circuit breaker contacts (not shown) are opened by means of the opening button 18 and the OPEN indicating flag is visible under the access slot 18A and are closed by means of the closing button 17 and the CLOSED indicating flag is visible under the access slot 17A. In accordance with the invention, a remote contact closing springs assembly 24 is attached to the sideframe 21 for interacting with the actuator tab 22 that extends through the slot 23 in the sideframe and interconnects with the close button 17 in the manner best seen by now referring to the remote contact closing assembly 24 depicted in FIGS. 2 and 3 both prior to and after attachment to the circuit breaker operating mechanism sideframe 21 next to the drive shaft 65.

The close button 17 connects with the actuator tab 22 by means of a lever 26 consisting of a parallel arm 27 and a vertical arm 28, as shown indicated. The closing solenoid 33 is positioned on the bottom 30 of the support 29 and positioned such that the plunger 34 ,connects with the drive link 59 by means of the pin 61 extending through the tabs 60 on the plunger and the through-holes 59A on the drive link 59. The holding solenoid 44 is positioned on the U-shaped support 29 next to the closing solenoid 33 such that the plunger 45 extends through the tab 58 arranged on the sidearm 56 of the U-shaped switch actuator lever 55. The closing lever 43 is positioned on the switch actuator lever 55 by positioning the rod 52 through coiled springs 38,49, through the openings 56A, 57A on the sidearms 56, 57 of the switch actuator 55 and through the openings 53A, 54A on the sidearms 53, 54 of the closing lever 43. The movable leg 39 of the spring 38 is positioned within the slot 41 formed within the top 42 of the closing lever 43 and extends in interfering relation with the actuator tab 22, while the stationary leg 40 is trapped within slot 42A of the closing lever 43. The movable leg 50 of the spring 49 is positioned against edge 53B of the leg 53 for interacting with the plunger 45, while the stationary leg 51 is positioned within a separate slot 42A within the top 42 of the closing lever 43. The extension spring 62 connects between the pin 59B on drive link 59 and the edge 30A of the bottom 30 support 29 to return the plunger 34 to its home position in the manner to be described below with reference to FIG. 2, FIG. 4 and FIG. 5. A pair of microswitches 35, 46 are attached to the extension 32A on the side 32 of the support 29 and positioned such that the crosspiece 67 on the switch actuator lever 55 interacts with the switch levers 37, 48 respectively. A multi-conductor cable 66 connects the switches with the closing solenoid, holding solenoid 44 as well as with a remote closing switch (not shown).

Figure 4:
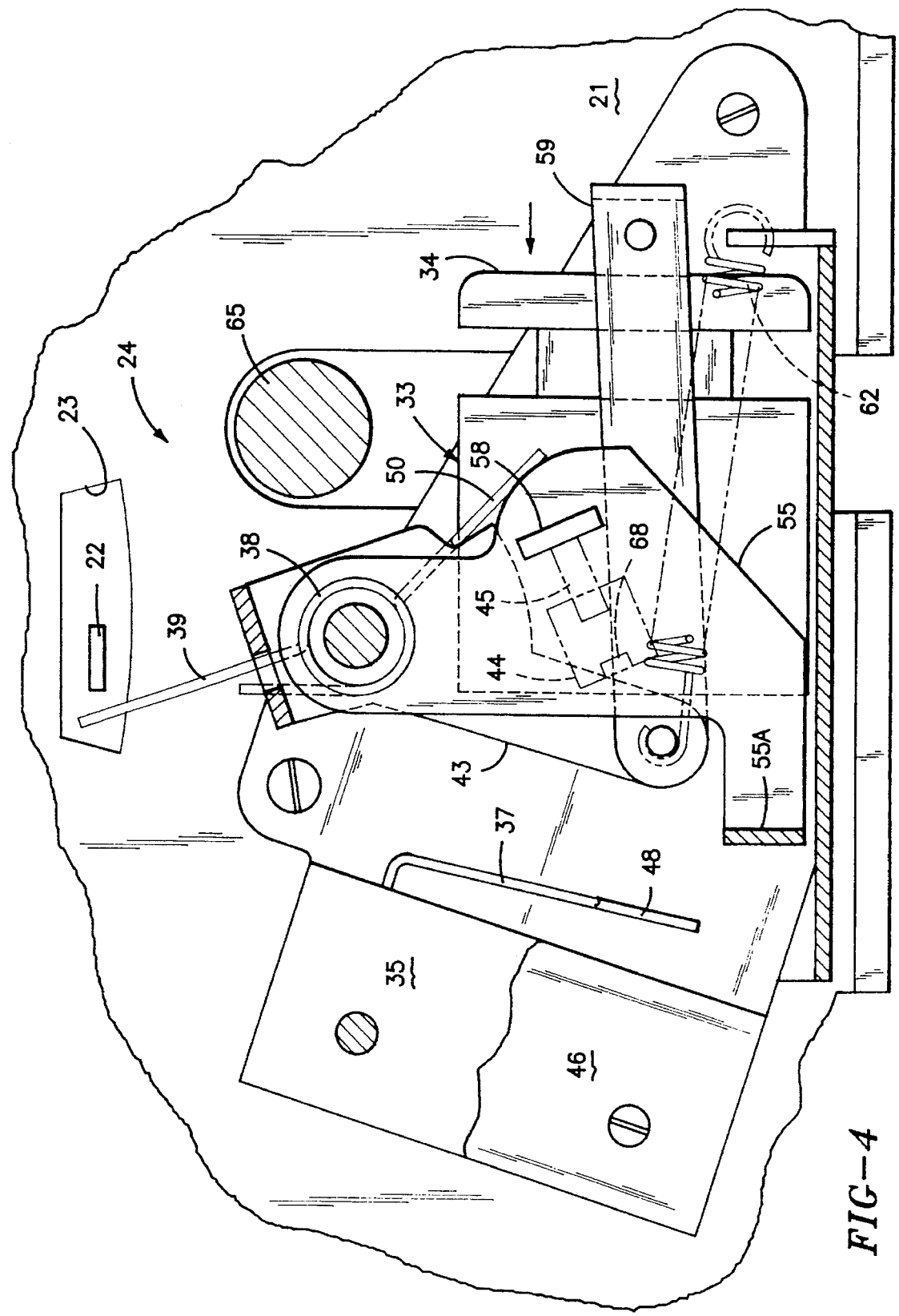
FIG. 4 is an enlarged plan side view in partial section of the remote contact closing assembly of FIG. 1 with the circuit breaker contacts in the open condition.
Figure 5:
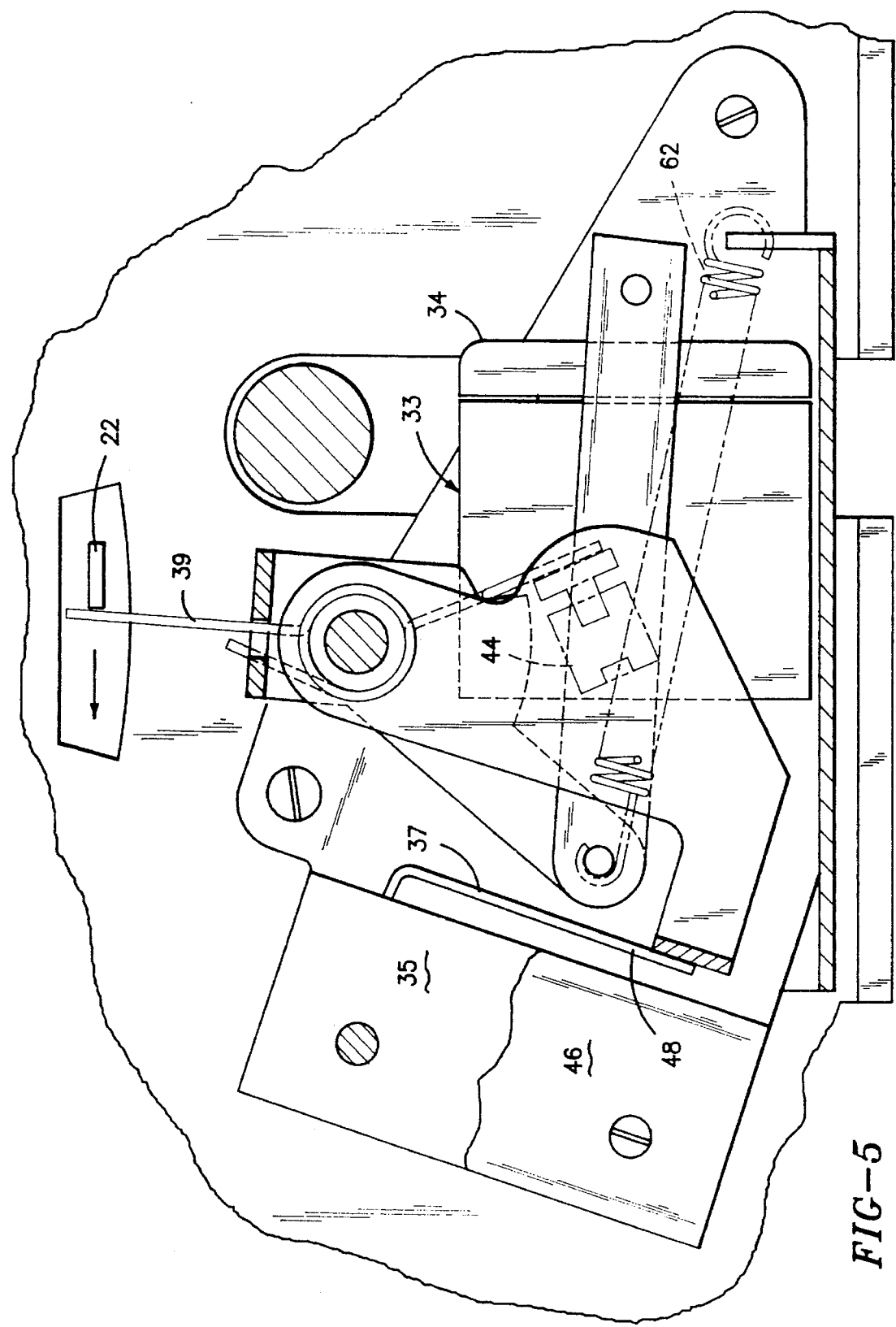
FIG. 5 is an enlarged plan side view in partial section of the remote closing assembly of FIG. 1 with the circuit breaker contacts in the closed condition.

The remote closing operator 24 on the circuit breaker operating mechanism sideframe 21 next to the drive shaft 65 is now shown in FIG. 4 with the circuit breaker contact closing springs charged and prior to operation of the remote closing switch described earlier. The actuator tab is at the left end of the slot 23 proximate the end of the movable leg 39 of the spring 38. The closing solenoid 33 and the holding solenoid 44 are depicted in phantom to show the positional relationship between the associated plungers 34, 45 and the closing lever 43 and the drive link 59. The switches 35, 46 are normally closed and normally open respectively and are arranged such that the associated levers 37 and 48 interact with the tab 55A on the end of the switch actuator lever 55. Switch 35 connects with the closing solenoid 33 and actuates the closing solenoid to thereby draw in the plunger 34 when the remote closing button is actuated to provide operating power to the closing solenoid. Switch 46 connects with the holding solenoid 44 and actuates the holding solenoid when the remote closing button switch is actuated as shown in FIGS. 4 and 5. Actuating the remote closing switch provides operating power through switch 35 to the closing solenoid 33 drawing the plunger 34 in the indicated direction and rotating the closing lever 43 clockwise to drive the movable leg 39 of the spring 38 against the actuator tab 22 in the indicated direction to release the contact closing springs. The moveable spring leg 50 strikes against the tab 58 at the end of the plunger 45 to move the plunger 45 against the holding magnet 68 and at the same time rotating switch actuator tab 55A against the lever 37, 48 electrically disconnecting the closing solenoid 33 while, at the same time electrically connecting the holding solenoid 44. As long as the remote closing switch remains energized, the remote closing operator 24 is in the condition depicted in FIG. 5 to prevent damage to the closing solenoid. As soon as the remote closing switch is de-energized, the switch actuator returns to the home position in FIG. 4 under the urgence of the reset spring 62.

We claim:

1. A circuit breaker comprising:
    a molded plastic base and cover;
    a circuit breaker closing spring within said cover and arranged for moving circuit breaker contacts to a closed position;
    an actuator lever within said cover arranged for releasing said closing spring;
    a remote closing assembly within said cover interacting with said actuator lever upon receipt of a remote signal for releasing said closing springs, said closing assembly including a closing lever interacting with said actuator lever and with a closing solenoid for moving said actuator lever to a releasing position; and
    a switch actuator lever interacting with said closing lever and a holding solenoid to electrically disconnect said closing solenoid when said closing springs are released.

2. The circuit breaker of claim 1 including a second switch 46 connecting with said holding solenoid 44 to electrically connect said closing solenoid when said closing springs are released.

3. The circuit breaker of claim 1 including a first spring 38 on said closing lever, said first spring having a first spring leg 39 contacting a top 41 of said lever and arranged for contacting a tab 22 extending from one end of said actuator lever.

4. The circuit breaker of claim 1 including a second spring 49 on said closing lever, said second spring having a second spring leg 50 contacting a tab 58 on said switch actuator.

5. The circuit breaker of claim 4 wherein said holding solenoid includes a holding plunger 45 connected to said tab, said tab driving said plunger to a holding position against a magnet 68 when said closing solenoid is electrically-energized.

6. The circuit breaker of claim 4 wherein said first and second springs comprise coiled springs.

7. The circuit breaker of claim 2 wherein said first switch is normally open and said second switch is normally closed.

8. The circuit breaker of claim 1 wherein said closing lever and said actuator lever are pivotally-connected together by a common rod 52.

9. A circuit breaker remote closing spring operator comprising:
    a closing lever interacting with a circuit breaker actuator lever and with a closing solenoid for moving said actuator lever to a releasing position;
    a switch actuator lever interacting with said closing lever and a holding solenoid to electrically disconnect said closing solenoid when said circuit breaker closing spring is released; and
    a first switch electrically energizing said closing solenoid upon receipt of said remote signal and a second switch connecting with said holding solenoid to electrically connect said closing solenoid when said closing spring is released.

10. The circuit breaker remote closing spring operator of claim 9 including a first spring 38 on said closing lever, said first spring having a first spring leg 39 contacting a top 41 of said lever and arranged for contacting a tab 22 extending from one end of said actuator lever, and a second spring 49 on said closing lever, said second spring having a second spring leg 50 contacting a tab 58 on said switch actuator.

11. The circuit breaker remote closing spring operator of claim 9 wherein said holding solenoid includes a holding plunger 45 connected to said tab, said tab driving said plunger to a holding position against a magnet 69 when said closing solenoid is electrically-energized.

12. The circuit breaker remote closing spring operator of claim 9 wherein said first and second springs comprise coiled springs.

13. The circuit breaker remote closing spring operator of claim 9 wherein said first switch is normally open and said second switch is normally closed.

14. The circuit breaker remote closing spring operator of claim 13 wherein said closing lever and said actuator lever are pivotally-connected together by a common rod 52.

* * * * *